(12) United States Patent
Choi

(10) Patent No.: US 7,584,987 B2
(45) Date of Patent: Sep. 8, 2009

(54) HOUSING STRUCTURE OF AN AIRBAG

(75) Inventor: Hyeong Ho Choi, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 138 days.

(21) Appl. No.: 11/580,004

(22) Filed: Oct. 12, 2006

(65) Prior Publication Data
US 2008/0007031 A1 Jan. 10, 2008

(30) Foreign Application Priority Data
Jul. 10, 2006 (KR) ................. 10-2006-0064454

(51) Int. Cl.
*B60R 21/02* (2006.01)

(52) U.S. Cl. ................. 280/728.2; 280/738; 280/740; 280/742

(58) Field of Classification Search ............. 280/728.2, 280/738, 739, 740, 742, 743.1
See application file for complete search history.

(56) References Cited

U.S. PATENT DOCUMENTS

| | | | | |
|---|---|---|---|---|
| 5,226,670 | A * | 7/1993 | Wright et al. | ............... 280/738 |
| 5,437,473 | A | 8/1995 | Henseler | |
| 5,529,334 | A | 6/1996 | Meduvsky et al. | |
| 5,588,675 | A | 12/1996 | Lotspih | |
| 6,692,021 | B2 * | 2/2004 | Amamori | ................... 280/739 |
| 6,932,385 | B2 * | 8/2005 | Hawthorn et al. | ........... 280/739 |
| 7,275,761 | B2 * | 10/2007 | Gould et al. | ................. 280/742 |
| 2004/0135352 | A1 * | 7/2004 | Igawa et al. | ................. 280/729 |

FOREIGN PATENT DOCUMENTS

| | | |
|---|---|---|
| JP | 06-001193 | 1/1994 |
| JP | 07-291085 | 11/1995 |
| KR | 2001-0013623 | 2/2001 |
| KR | 1020040072835 A | 8/2004 |
| KR | 1020050093859 | 9/2005 |
| WO | WO/9856624 A1 | 12/1998 |
| WO | WO 2004/071820 A1 | 8/2004 |

* cited by examiner

*Primary Examiner*—Paul N. Dickson
*Assistant Examiner*—Timothy Wilhelm
(74) *Attorney, Agent, or Firm*—Morgan, Lewis & Bockius LLP

(57) ABSTRACT

A housing structure of an airbag includes: an airbag housing body having an airbag therein and vent holes formed therein; a partitioning plate installed to the airbag housing body and rotatable in an inward or an outward direction of the vent hole; a cover plate provided inside a slot hole formed along the width of the airbag housing body, and has a size large enough to be able to cover perforated regions of the vent holes and; a diffuser in which the first end is fixed to an outer end portion of the airbag housing body and extends along the inner surface of the airbag housing body and the second end of the diffuser being connected to the cover plate, thereby allowing gas to be generated in an inflator to push the cover plate forward.

4 Claims, 7 Drawing Sheets

HOUSING STRUCTURE OF AN AIRBAG

CROSS-REFERENCE TO RELATED APPLICATION

This application claims priority to of Korean Patent Application No. 10-2006-0064454 filed in the Korean Intellectual Property Office on Jul. 10, 2006, the disclosures of which are incorporated herein by reference.

BACKGROUND OF THE INVENTION (a) Field of the Invention

The present invention relates to a housing structure for an airbag.

(b) Description of the Related Art

Generally, in order to protect an occupant during a vehicle crash, an airbag module is installed in the steering wheel or in the instrument panel.

The airbag module deploys an airbag when a vehicle crashes, thus preventing an occupant from colliding with the windshield and reducing injuries on the occupant.

The airbag module includes an airbag housing cover, an inflator which generates gas when a vehicle crashes, an airbag which is deployed by gas generated by the inflator, a sensor, and an electronic control module which ignites a percussion cap of the inflator.

The inflator includes a percussion cap which is ignited by a control signal output from the electronic control module, and generates gas compositions in response to the ignition of the percussion cap.

In such an airbag module, if a crash sensor monitors a speed decrease caused by a frontal collision, the crash sensor generates a predetermined signal. If the electronic control module receives the collision signal output from the crash sensor, the electronic control module ignites the percussion cap of the inflator which burns gas generating compositions.

The gas generated by the inflator rapidly inflates and deploys the airbag which protects an occupant from moving toward. At the same time, gas is discharged from the airbag through a gas discharging hole perforated in the airbag which absorbs the impact from the occupant, thereby reducing injuries on an occupant.

FIG. 1 is a drawing showing a pressure gradient of gas generated in a conventional inflator.

Referring to FIG. 1, when an airbag (not shown) is deployed, gas pressure changes with a gradient A of FIG. 1.

A top pressure in the gradient A is a pressure at which a general airbag operates. The pressure range at which a general airbag operates is between about 450 KPa to about 550 KPa. However, this amount of pressure may inflict severe injuries on a head, a neck, and a chest of an occupant in case the occupant does not fasten a seat belt or the occupant is sitting at the front portion of the seat.

On the other hand, if the pressure of an inflator deploying an airbag is substantially decreased or if the size of an airbag is decreased, an inflated airbag cannot sufficiently absorb the impact with the occupant, resulting in injury to the occupant.

In FIG. 1, gradient B is a pressure change at which injuries on a occupant can be minimized with the top pressure in gradient B being between about 340 KPa to about 380 KPa. Recently, technology for deploying an airbag with a pressure at which injuries on an occupant can be minimized will be explained in detail in this invention.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention provides a housing structure of an airbag which minimizes injury on an occupant by decreasing pressure at an initial stage of airbag deployment and supplementing insufficient pressure of the airbag by supplying air through a vent hole into the air bag.

An exemplary embodiment of the present invention provides a housing structure of an airbag including: an airbag housing body in which an airbag is installed and in which vent holes are formed longitudinally and are spaced from each other; a partitioning plate installed to the airbag housing body inside of the vent hole which is rotatable in an inward and an outward direction of the vent hole; a cover plate provided inside a slot hole formed along the width of the airbag housing body and having a size large enough to be able to cover perforated regions of the vent holes and; a diffuser in which the first end is fixed to an outer end portion of the airbag housing body, and the first end extends along the inner surface of the airbag housing body and the second end of the diffuser is connected to the cover plate, thereby causing gas generated in an inflator to push the cover plate forward.

The vent hole may be formed at an upper surface or a lower surface of the airbag housing body. The partitioning plate may be made of metal or rubber.

The cover plate may be configured to be operated by a tether on a first end of which is fixed to an inside of the airbag and a second end of which is fixed to a frontal end portion of the cover plate.

DETAILED DESCRIPTION OF THE EMBODIMENTS

An exemplary embodiment of the present invention will hereinafter be described in detail with reference to the accompanying drawings.

Figure 1:
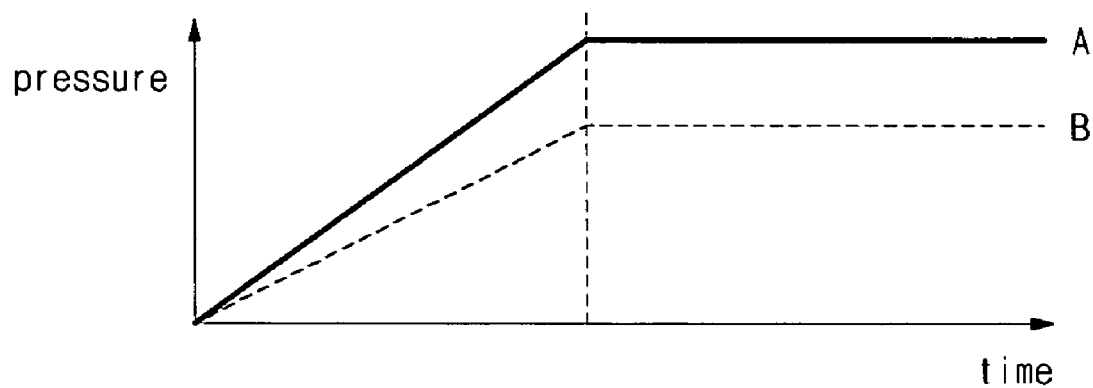
FIG. 1 is a drawing showing a pressure change of gas generated in a conventional inflator.
Figure 2A:
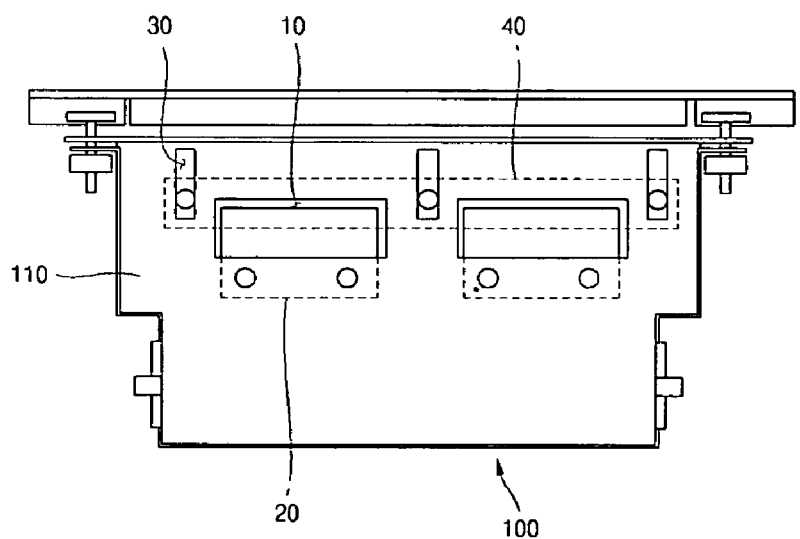
FIGS. 2A and 2B are drawings showing a housing structure of an airbag according to an embodiment of the present invention.
Figure 2B:
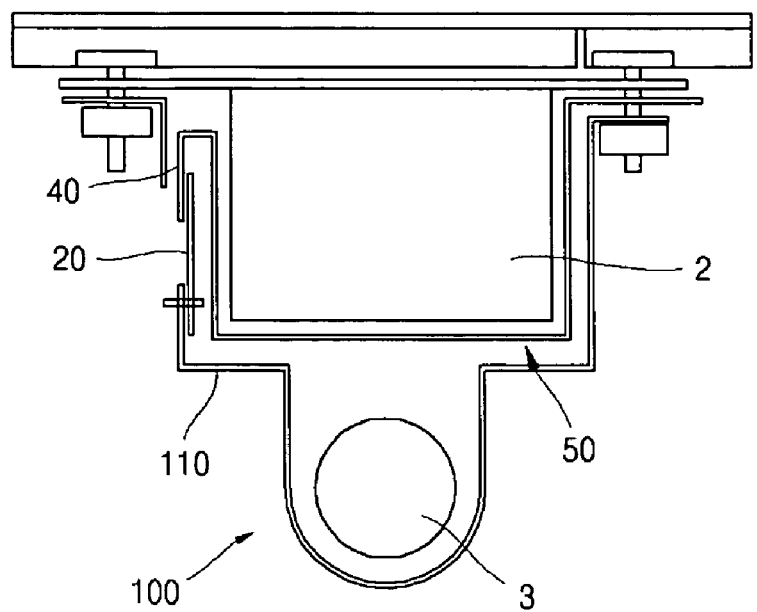

FIGS. 2A and 2B are drawings showing a housing structure of an airbag according to an embodiment of the present invention. FIG. 3A to 3E are drawings showing operating states of a housing structure of an airbag according to an embodiment of the present invention.

Referring to FIGS. 2A and 2B, an airbag 2 for protecting an occupant occupying a seat is installed within an airbag housing body 110. Vent holes 10 are perforated in the airbag housing body 110 longitudinally and vent holes are spaced from each other so that gas can flow through the vent holes 10. The vent holes 10 may be formed at an upper surface or a lower surface of the airbag housing body 11.

A partitioning plate 20 is installed inside the vent hole 10 which is rotatable in inward and outward directions of the vent hole 10. The partitioning plate 20 may be made of metal or rubber. When the partitioning plate 20 is made of metal, the partitioning plate 20 is configured to flexibly operate.

A slot hole 30 is formed along the width of the airbag housing body 110, and a cover plate 40 is installed inside the slot hole 30. The cover plate 40 has a size large enough to be able to cover the perforated regions of the vent holes 10.

A diffuser 50 is installed within the airbag housing body 110. The first end of the diffuser 50 is fixed to an outer end portion of the airbag housing body 110 and extends toward the inside of the airbag housing body 110. The diffuser 50 is bent in accordingly to correspond to the shape of an inner surface of the airbag housing body 110. The second end of the diffuser 50 is connected to the cover plate 40. The diffuser 50 and the airbag housing body 110 are arranged such that an inflator 30 is disposed in between. Accordingly, the diffuser 50 is moved by gas generated by the inflator 3 which pushes the cover plate 40 forward.

The cover plate 40 and the diffuser 50 may be connected to each other by a rivet.

The cover plate 40 is configured to be operated by a tether. The first end of the tether is connected to an inner portion of the airbag while the second end thereof is connected to a frontal end of the cover plate 40.

Operations of the airbag housing structure according to an embodiment of the present invention will now be explained with reference to the accompanying drawings.

Figure 3A:
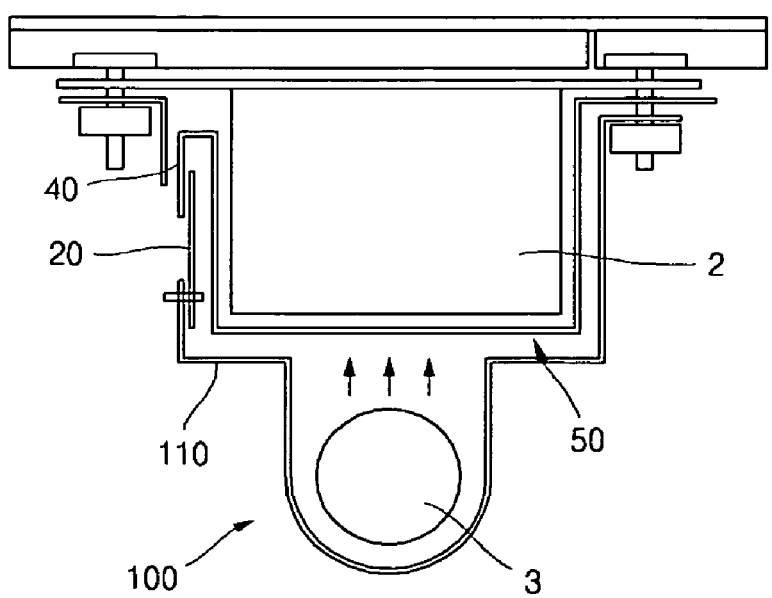
FIG. 3A to 3E are drawings showing operating states of a housing structure of an airbag according to an embodiment of the present invention.

Referring to FIG. 3A, if there is a vehicle collision, a collision signal in response to the detection of a collision is input to a control unit (not shown). The control unit outputs an operation signal to operate the inflator 3. The control unit may comprise a processor, memory and associated hardware and software as may be selected and programmed by persons of ordinary skill in the art based on the teachings of the present invention contained herein.

Figure 3B:
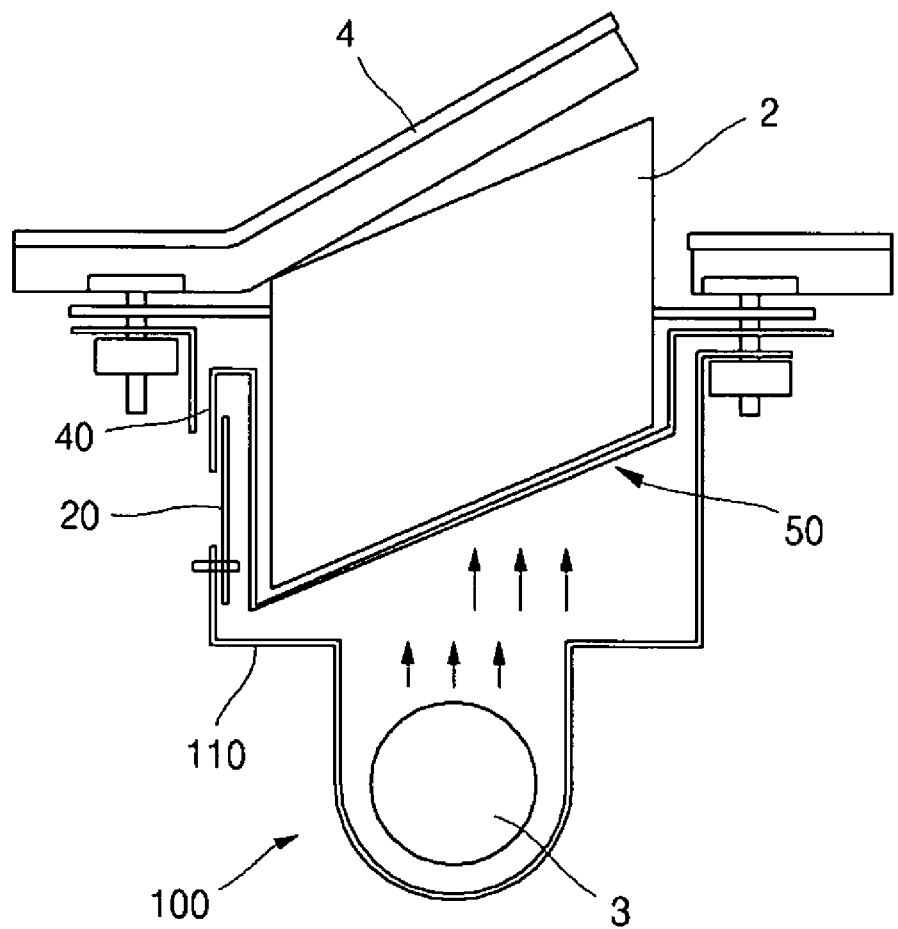

Referring to FIG. 3B, high-pressure gas is generated in the inflator 3 which flows to the diffuser 50, thereby supplying gas into the airbag 2. An airbag door 4 which is provided in a crash pad is rotated outward by the pressure of gas supplied into the airbag 2. This rotation causes the airbag 2 starts to deploy inside the vehicle.

At this time, the cover plate 40 closes the vent hole 10 such that gas generated in the inflator 3 is prevented from being discharged from the airbag housing 100.

Figure 3C:
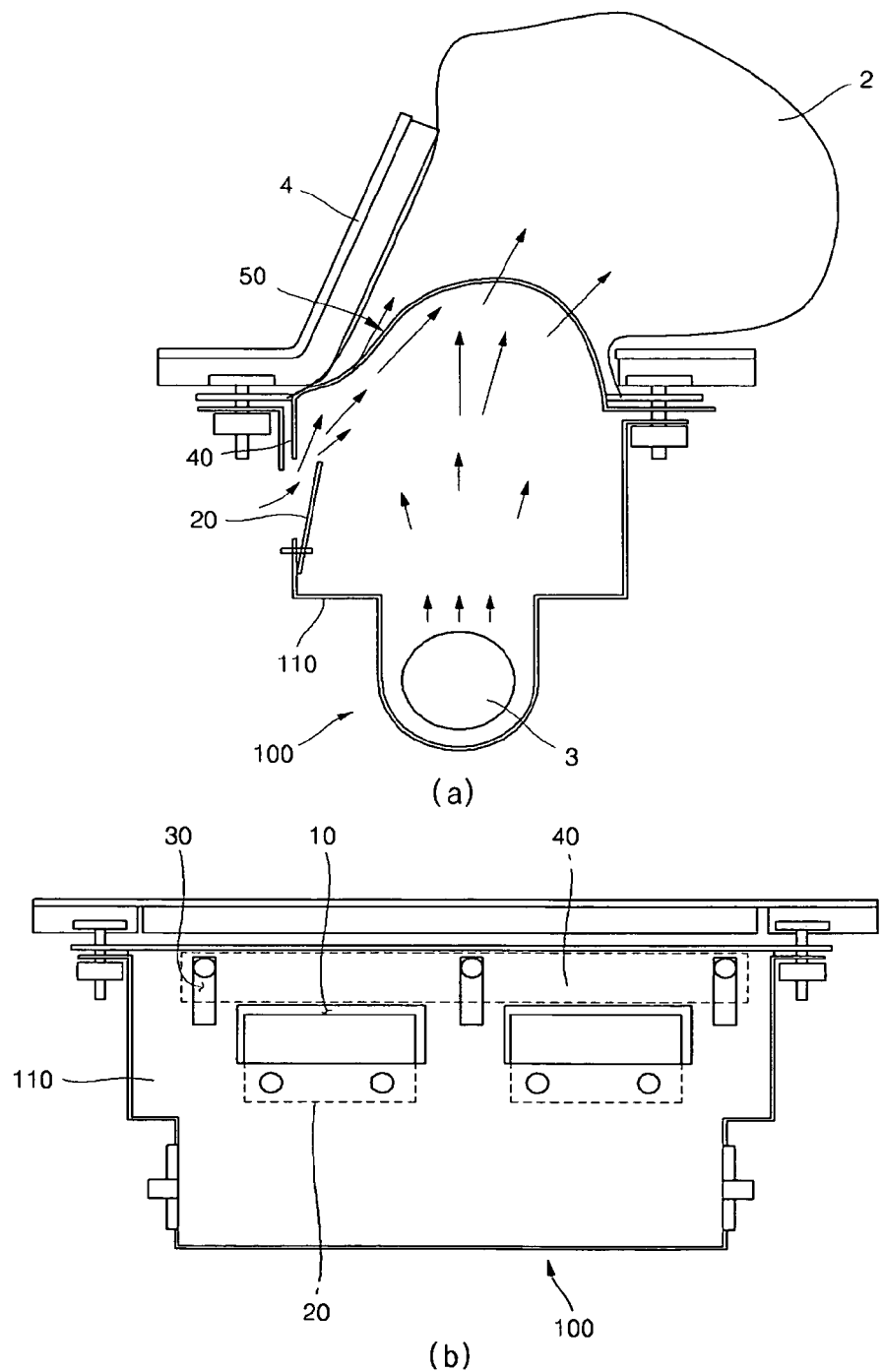

Referring to FIG. 3C, while the airbag door 4 deploys inside the vehicle so caused by the deploying pressure of the airbag 2 as shown in (a), the cover plate 40 moves along the slot hole 30 by the diffuser 50 at an inner surface of the airbag housing body 110 so as to be at a position as shown in (b).

While the cover plate 40 moves, a negative pressure is momentarily formed within the airbag 2, thus rotating the partitioning plate 20, which is installed in the vent hole, in an inward direction of the vent hole 10. Accordingly, external air outside the airbag housing 100 is supplied into the airbag 2 through the vent hole 10, thus filling the airbag when the airbag deploys.

Figure 3D:
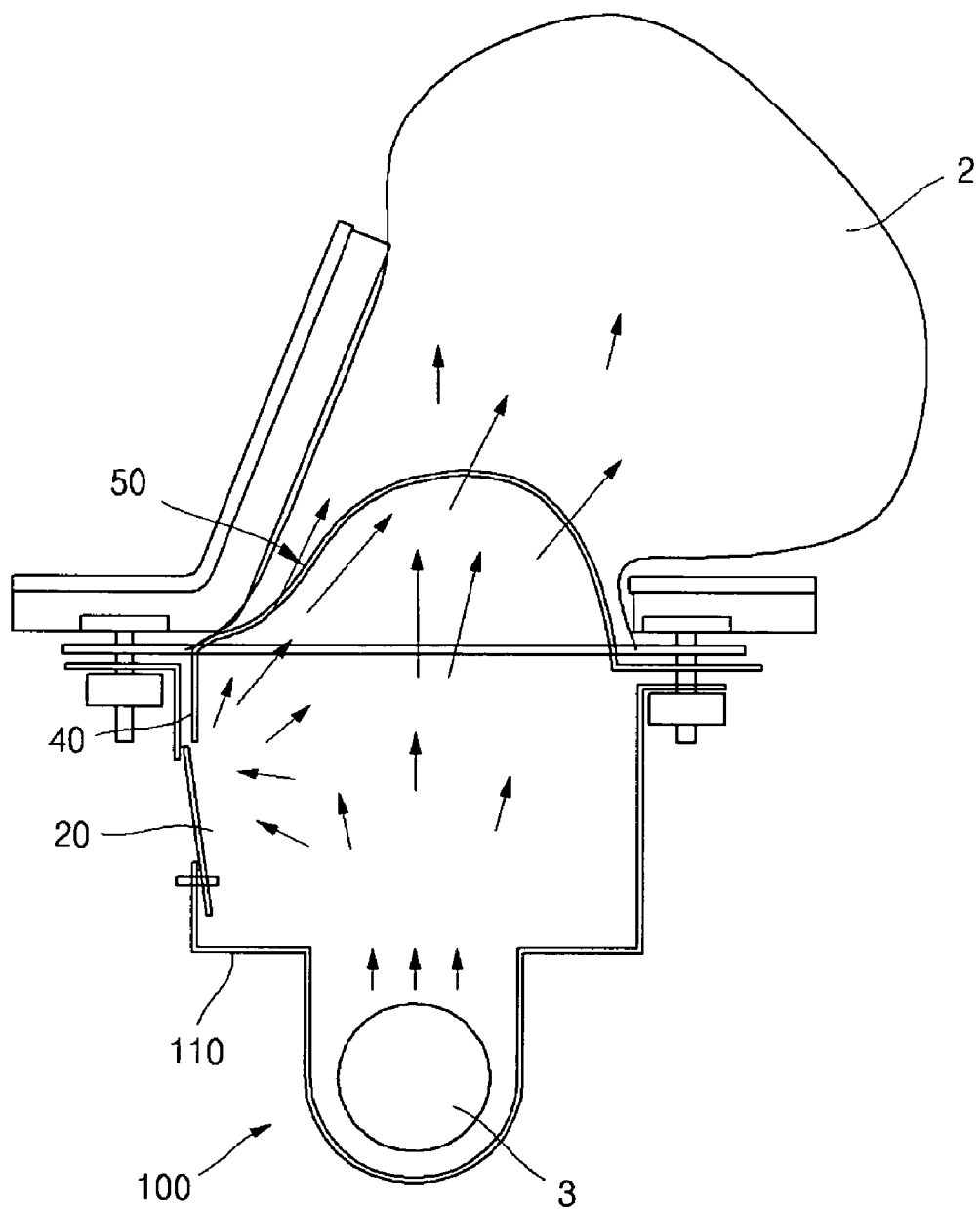

Referring to FIG. 3D, if the negative pressure within the airbag 2 disappears, the partitioning plate 20 provided in the vent hole 10 (referring to FIG. 2A) blocks the vent hole 10 which prevents gas from discharging from airbag 2 through the vent hole 10. Therefore, the deployment of the airbag 2 can be maintained.

Figure 3E:
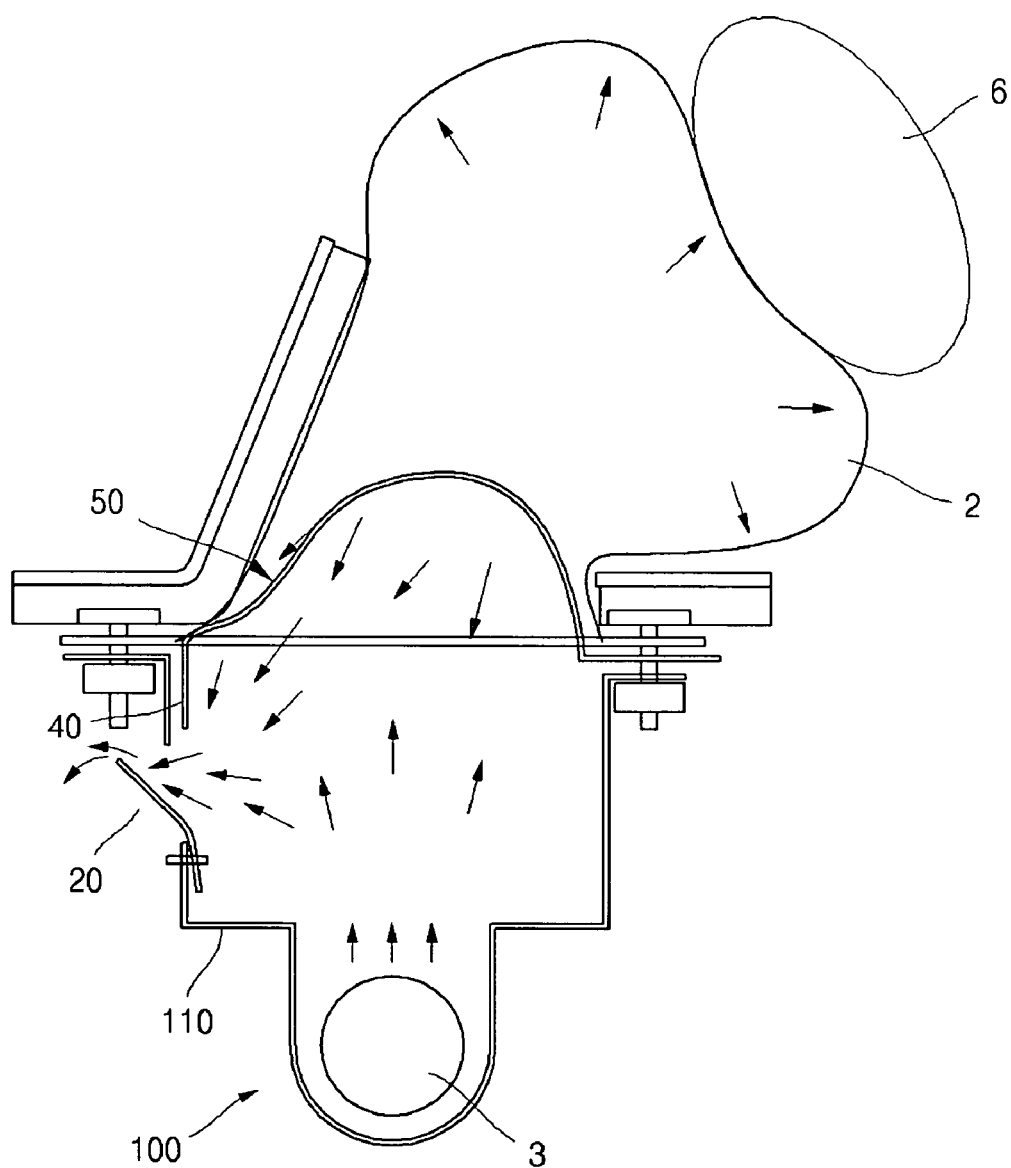

Referring to FIG. 3E, if an occupant 6 collides with the airbag 2 when the airbag 2 is fully deployed, a portion of gas inside the airbag 2 corresponding to an amount of deformation of the airbag 2 caused by the collision with the occupant 6 pressurizes an inner surface of the partitioning plate 20 which rotates the partitioning plate 20 in an outward direction of the vent hole 10.

Since the vent hole 10 is opened by the rotation of the partitioning plate 20, gas within the airbag 2 can be discharged into an inner space of the crash pad instead of being discharged inside the vehicle, thus preventing air contamination inside the vehicle.

In order to operate the cover plate 40, a tether (not shown) is provided within the airbag 2 and can be used instead of the diffuser 50. That is, the first end of the tether is fixed to the inside of a frontal end of the airbag 2, and the second end of the tether is connected to the cover plate 40, so that the cover plate 40 can move forward by the tether fixed thereto while the airbag 2 deploys.

Figure 4:
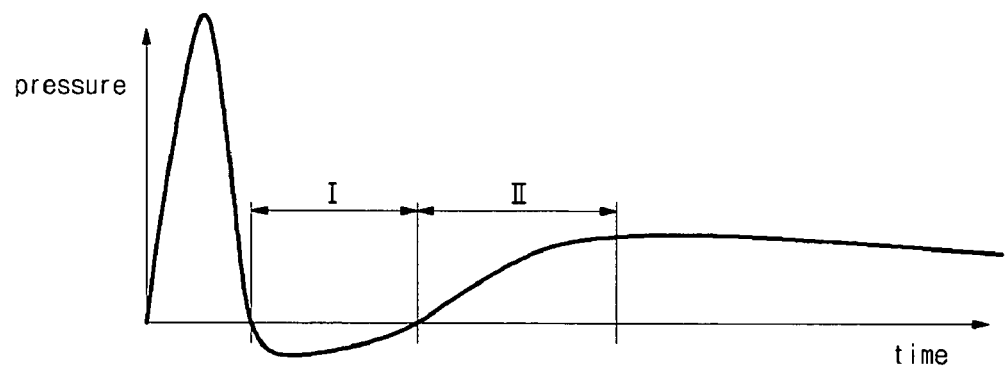
FIG. 4 is a drawing showing a pressure change within an airbag deployed by a housing structure of an airbag according to an embodiment of the present invention.

FIG. 4 is a drawing showing a pressure change within an airbag deploying by a housing structure of an airbag according to an embodiment of the present invention.

Referring to FIG. 4, the pressure of gas generated in the inflator 3 is increased in an initial stage of deployment of the airbag 2, and then the pressure of gas is abruptly decreased.

In section I of FIG. 4, the airbag 2 dramatically deploys inside the vehicle because of the negative pressure formed within the airbag 2. At this time, the partitioning plate 20 rotates which opens the vent hole 10, thus supplying outside air into the airbag 2 through the vent hole 10.

In section II of FIG. 4, the airbag 2 is fully deployed, and an occupant collides with the airbag. At this time, a sudden change of pressure of gas within the airbag 2 occurs by the collision of the airbag 2 and an occupant, thereby rotating the partitioning plate 20 in an outward direction of the vent hole 10. Accordingly, the vent hole 10 is opened, and a portion of gas within the airbag 2 is discharged into the crash pad.

Accordingly, the airbag 2 deploys at a low pressure, so negative pressure within the airbag 2 may cause outside air to be supplied into the airbag 2, so that the airbag 2 can be fully deployed. In addition, a portion of gas within the airbag 2 can be discharged by the collision between the airbag 2 and an occupant, so that injury on an occupant can be minimized.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A housing structure of an airbag, comprising:
    an airbag housing body in which the airbag is installed and in which a plurality of vent holes are formed longitudinally along the airbag housing body and the vent holes are spaced from each other;
    a partitioning plate installed to the airbag housing body inside of the vent holes to be rotatable inward and outward of the vent holes;
    a cover plate having a portion that is disposed inside a slot hole formed along the width of the airbag housing body, and has a size large enough to be able to cover perforated regions of the vent holes; and
    a diffuser, the first end of which is fixed to an outer end portion of the airbag housing body, and is extended into the inner surface of the airbag housing body and the second end of which is connected to the cover plate, thereby allowing gas generated in an inflator to push the cover plate upwards for selectively opening the vent holes by the partitioning plate.

2. The housing structure of an airbag of claim 1, wherein the vent holes are formed at an upper surface or a lower surface of the airbag housing body.

3. The housing structure of an airbag of claim 1, wherein the partitioning plate is made of metal or rubber.

4. The housing structure of an airbag of claim 1, wherein the cover plate is configured to be operated by a tether, the first end of which is fixed inside the airbag and the second end of which is fixed to a frontal end portion of the cover plate.

* * * * *